(12) United States Patent  
Yamamoto

(10) Patent No.: US 7,569,315 B2  
(45) Date of Patent: Aug. 4, 2009

(54) COLOR FILTER AND METHOD OF PRODUCING SAME

(75) Inventor: Manabu Yamamoto, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 293 days.

(21) Appl. No.: 11/445,406

(22) Filed: Jun. 1, 2006

(65) Prior Publication Data

US 2007/0020439 A1    Jan. 25, 2007

(30) Foreign Application Priority Data

Jun. 3, 2005    (JP) .............................. 2005-163862

(51) Int. Cl.
*G02B 5/20* (2006.01)

(52) U.S. Cl. .......................... 430/7; 427/162

(58) Field of Classification Search ....................... None
See application file for complete search history.

(56) References Cited

FOREIGN PATENT DOCUMENTS

| JP | 2001-074928 | 3/2001 |
| JP | 2005-292337 A * | 10/2005 |

OTHER PUBLICATIONS

Computer-generated translation of JP 2005-292337 (Oct. 2005).*

* cited by examiner

*Primary Examiner*—John A. McPherson  
(74) *Attorney, Agent, or Firm*—Ladas & Parry LLP

(57) ABSTRACT

A main object of the present invention is to provide a high-quality color filter having a colored layer formed by use of a difference in wettability in the surface of a photocatalyst containing layer, wherein white spots and color unevenness are not present in the colored layer and a method for producing the same. To achieve the object, the present invention provides a color filter comprising: a base material; a light shielding part formed on the base material and containing a light shielding material and a resin; a photocatalyst containing layer formed to cover the base material and the light shielding part and containing a photocatalyst and an organopolysiloxane; and a colored layer formed on the photocatalyst containing layer in an opening part made in the light shielding part, wherein the widths of thin film regions of both sides each having a film thickness decreased in a tapered form from a central portion of the light shielding part are each in the range from 20 to 40% of the line width of the light shielding part, and the film thickness of the photocatalyst containing layer is in the range from 0.01 to 0.5 μm.

2 Claims, 3 Drawing Sheets

COLOR FILTER AND METHOD OF PRODUCING SAME

BACKGROUND OF THE INVENTION

1. Field of the Invention

The present invention relates to a color filter, obtained by coloring a colored layer with an ink jet method, suitable for a color liquid crystal display and the producing method of the same.

2. Description of the Related Art

Recently, with the development of the personal computers, in particular, the development of the portable personal computers, demand for liquid crystal displays, especially for color liquid crystal displays tends to be increased. Further, bigger liquid crystal displays are in demand. However, the color liquid displays are expensive; therefore, a request that the cost should be reduced has been increasing. In particular, a request that the cost of their color filters, which accounts for a high ratio in the total cost, should be reduced has been raised.

Such color filters, in general, comprise colored patterns of three primary colors of red (R), green (G) and blue (B) so that liquid crystals are operated as a shutter by switching on or off the electrodes each corresponding to the pixels of R, G and B. Thereby, color display can be provided according to light transmission to the each pixel of R, G and B.

The color filter producing method which has been hitherto performed is, for example, a dye method. In this dye method, a water-soluble polymer which is a material for dyeing is first produced on a glass substrate, patterned into a desired shape in a photolithographic step, and then the resultant pattern is immersed into a dyeing bath to yield a colored pattern. This is repeated three times, thereby forming color filter layers in R, G and B.

Another example of the producing method is a pigment dispersion method. In this method, a photosensitive resin layer wherein a pigment is dispersed is first formed on a substrate, and patterned to yield a mono-colored pattern. This step is further repeated three times, thereby forming color filter layers in R, G and B.

Different examples of the method include an electrode positing method, and a method of dispersing R, G and B pigments in thermosetting resins, respectively, performing printing for R, G and B three times, and then thermosetting the resins. However, according to the methods, in any case, the same step should be repeated for three times for coloring the three colors of R, G and B so that problems are involved in that the cost is increased or the yield is lowered due to the repetition of the steps.

In the meantime, the applicant has been investigating a method for producing a color filter, including the steps of using a property changeable pattern forming coating solution containing a photocatalyst and a material having a property changed by the action of a photocatalyst accompanied by energy irradiation to form a photocatalyst containing layer, exposing the resultant in a pattern form to light, so as to form a pattern with the property changed, and then forming a colored layer by such as an ink jet method (Japanese Patent Application Laid-Open No. 2001-074928). According to this method, the property of the photocatalyst containing layer is used to make it possible to form a colored layer easily.

The formation of the photocatalyst containing layer used in such a method is attained, as illustrated in, for example, FIGS. 5A and 5B, by coating a photocatalyst containing layer forming composition 13 onto a base material 1 on which a light shielding part 2 is formed (FIG. 5A) and then drying this photocatalyst containing layer forming composition 13 (FIG. 5B) When the light shielding part is a light shielding part made of a resin at this time, it is necessary to make the film thickness thereof larger than that of any light shielding part made of a metal such as a chromium from the viewpoint of light shielding property and others. Thus, it is necessary to make the film thickness thereof about ten times larger than that of the photocatalyst containing layer. Usually, the applied photocatalyst containing layer forming composition is dried until the film thickness is turned into about $\frac{1}{100}$. In this way, the composition is made into the photocatalyst containing layer. Accordingly, when the photocatalyst containing layer forming composition is applied onto the base material with this resin light shielding part formed thereon and then dried, the photocatalyst containing layer is not easily formed in consistency with the shapes of the light shielding part in the case where the light shielding part has a shape perpendicular to the base material. This is because the film thickness of the light shielding part changes abruptly at end portion (i.e., edge) of the light shielding part. In particular, on side face of the light shielding part, the photocatalyst containing layer sometime become thin or is chipped. When unevenness in film thickness or chipping is generated in the photocatalyst containing layer, at the time of using a difference in wettability in the photocatalyst containing layer to apply a colored layer forming coating solution into opening parts made in the light shielding part, for example, the light shielding part having liquid repellency is made exposed in the region where this photocatalyst containing layer is chipped, or the other region. Consequently, the colored layer forming coating solution neither wets nor spreads sufficiently, so that such as white spots or color unevenness may be generated.

SUMMARY OF THE INVENTION

Accordingly, it is desired to provide a high-quality color filter having a colored layer formed by use of a difference in wettability in the surface of a photocatalyst containing layer, wherein white spots and color unevenness are not present in the colored layer and a method for producing the same.

The present invention provides a color filter comprising: a base material; a light shielding part formed on the base material and containing a light shielding material and a resin; a photocatalyst containing layer formed to cover the base material and the light shielding part and containing a photocatalyst and an organopolysiloxane; and a colored layer formed on the photocatalyst containing layer in an opening part made in the light shielding part, wherein the widths of thin film regions of both sides each having a film thickness decreased in a tapered form from a central portion of the light shielding part are each in the range from 20 to 40% of the line width of the light shielding part, and the film thickness of the photocatalyst containing layer is in the range from 0.01 to 0.5 µm.

According to the invention, both the sides of the light shielding part are formed to satisfy the above-mentioned range and have the above-mentioned thin regions; therefore, a change in the film thickness of the light shielding part can be made small. For this reason, when a photocatalyst containing layer forming composition, for forming the photocatalyst containing layer, is applied to cover this light shielding part and then dried, the photocatalyst containing layer having the target film thickness can be formed in consistency with the shapes of the light shielding part. Thus, at the side faces of the light shielding part, and so forth, neither chipping nor unevenness in the film thickness is generated in the photocatalyst containing layer. In this way, the wettability of the surface of the photocatalyst containing layer can be evenly changed by the action of the photocatalyst accompanied by energy irradiation. This difference in the wettability in the photocatalyst containing layer surface is used to render the color filter a high-quality color filter wherein the colored layer having no white spots or color unevenness is easily formed.

Further, the present invention provides a method of producing a color filter comprising: a base material; a light shielding part formed on the base material and containing a light shielding material and a resin; a photocatalyst containing layer formed to cover the base material and the light shielding part and containing a photocatalyst and an organopolysiloxane; and a colored layer formed on the photocatalyst containing layer in an opening part made in the light shielding part, wherein the method of producing a color filter comprising: a light shielding part forming step of forming the light shielding part in such a manner that the widths of thin film regions of both sides each having a film thickness decreased in a tapered form from a central portion of the light shielding part are each in the range from 20 to 40% of the line width of the light shielding part; and a photocatalyst containing layer forming step of applying a photocatalyst containing layer forming composition, comprising at least the photocatalyst and the organopolysiloxane and having a concentration of solid content of 0.1 to 10%, into a film thickness in the range from 1 to 100 µm, and drying the resultant to form the photocatalyst containing layer.

According to the invention, the light shielding part is formed to set the respective width of the thin region of the light shielding part into the above-mentioned range; therefore, a change in the film thickness of the light shielding part can be made small. For this reason, when the photocatalyst containing layer forming composition having the above-mentioned solid content concentration is applied into the above-mentioned film thickness and then dried, the photocatalyst containing layer can be formed in consistency with the shapes of the light shielding part. In this way, in the colored layer formed by using the property that the wettability in the surface of the photocatalyst containing layer is changed by the action of the photocatalyst accompanied by the energy irradiation to the photocatalyst containing layer, neither white spots nor color unevenness is generated. Thus, a high-quality color filter can be produced.

DESCRIPTION OF THE PREFERRED EMBODIMENT

The present invention relates to a color filter obtained by coloring a colored layer with an ink jet method, which is suitable for a color liquid crystal display, and the producing method of the same. Hereinafter, each of them will be explained in detail.

A. Color Filter

First, the color filter of the present invention will be explained. The color filter of the invention comprising: a base material; a light shielding part formed on the base material and containing a light shielding material and a resin; a photocatalyst containing layer formed to cover the base material and the light shielding part and containing a photocatalyst and an organopolysiloxane; and a colored layer formed on the photocatalyst containing layer in an opening part made in the light shielding part, wherein the widths of thin film regions of both sides each having a film thickness decreased in a tapered form from a central portion of the light shielding part are each in the range from 20 to 40% of the line width of the light shielding part, and the film thickness of the photocatalyst containing layer is in the range from 0.01 to 0.5 µm.

Figure 1A:
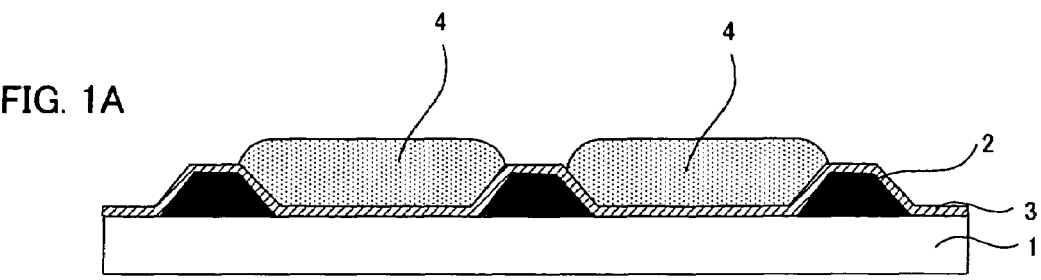
FIGS. 1A and 1B are each an explanatory view illustrating an example of the color filter of the invention.
Figure 1B:
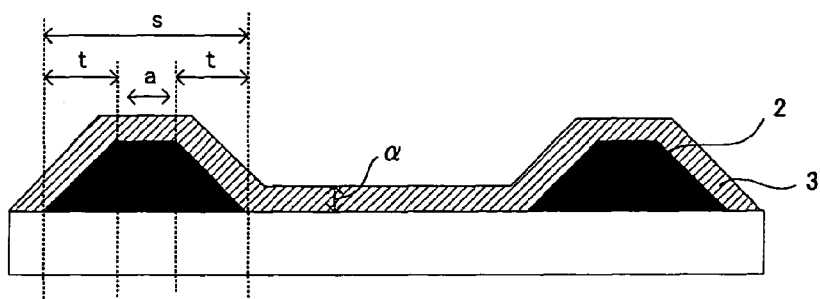

As illustrated in, for example, FIG. 1A, the color filter of the invention has a base material 1, a light shielding part 2 formed on the base material 1, a photocatalyst containing layer 3 formed to cover the base material 1 and the light shielding part 2, and a colored layer 4 formed in an opening part made in the light shielding part 2 on the photocatalyst containing layer 3. About the light shielding part 2, the widths "t" of thin film regions of both sides each having a film thickness decreased in a tapered form from a central portion "a" of the light shielding part 2 are each in the range of the predetermined percentages of the line width "s" of the light shielding part 2. The sides mean regions including side faces of the light shielding part, and the line width of the light shielding part means the width from one side end of the line portion to the other side end. The central portion of the light shielding part means two central regions obtained when the line width of the light shielding part is divided into 20 equal portions. The wording "the film thickness decreased in a tapered form" means the film thickness which is gradually decreased from the film thickness of the central portion.

When the shapes of a light shielding part is, for example, perpendicular to the base material, the thickness of the light shielding part changes abruptly at ends of the light shielding part. Accordingly, when a photocatalyst containing layer forming composition is applied onto the light shielding part and then dried, this composition is not easily formed in consistency with the shape of the light shielding part so that the photocatalyst containing layer may be chipped or the film thickness thereof may become uneven at the side of the light shielding part. In this case, at the time of irradiating energy onto the photocatalyst containing layer into the form of a pattern for forming a colored layer and then applying a colored layer forming coating solution, for forming a colored layer, for example, the light shielding part having liquid repellency is made exposed. Consequently, in this part, the colored layer forming coating solution neither wets nor spreads sufficiently, so that such as white spots or color unevenness may be generated in the colored layer.

On the other hand, according to the invention, the widths of the thin regions of the light shielding part are each set into the range of the specified percentages of the line width of the whole of the light shielding part; therefore, in both the sides of the light shielding part, a change in the film thickness can be made small. Thus, no abrupt change in the film thickness is caused in the end portions of the light shielding part, so that the photocatalyst containing layer can be formed in consistency with the shapes of the light shielding part. As a result, chipping or unevenness in the film thickness is not caused in the photocatalyst containing layer. According to this, at the time of using the nature that the wettability of the photocatalyst containing layer is changed by the action of the photocatalyst accompanied by the energy irradiation of this layer to apply a colored layer forming coating solution for forming a colored layer in the opening part in the light shielding part, the colored layer forming coating solution can wet and spread sufficiently. Thus, a high-quality color filter wherein neither white spots nor color unevenness is generated in the colored layer can be produced. In the end portion of the light shielding part, the film thickness of the colored layer changes; however, this portion is substantially used as the light shielding part since the light shielding part and the colored layer are laminated in this portion. For this reason, in the opening part partitioned by the light shielding part, the colored layer has an even film thickness and gives no color unevenness or the like.

The following will explain each of the constituents of the color filter of the invention in detail.

(Light Shielding Part)

First, the light shielding part used in the color filter of the invention will be explained. The light shielding part is formed on the base material which will be detailed later and is a part which contains a light shielding material and a resin. The widths of thin film regions of both sides each having a film thickness decreased in a tapered form from a central portion of the light shielding part are each in the range of predetermined percentages of the line width of the light shielding part.

Specifically, the widths of the thin film regions of both the sides of the light shielding part are each in the range from 20 to 40%, preferably in the range from 25 to 35%, more preferably from 28 to 32% of the line width of the light shielding part. When the ratio of each of the widths of the thin film regions to the line width of the light shielding part is set into the above-mentioned range, a change in the film thickness in the light shielding part can be made small so that the generation of such as chipping and unevenness in film thickness can be prevented in the photocatalyst containing layer which will be detailed later. The line width of the light shielding part and the widths of the thin film regions can be calculated out from a photograph obtained by photographing a sectional shape of the light shielding part with a scanning electron microscope (SEM) or the like.

The width of the whole the light shielding part, that is, the line width of the light shielding part depends on the shape of the color filter, or other factors. It is set into the range usually from 6 to 35 µm, preferably from 10 to 30 µm, more preferably from 16 to 30 µm. The film thickness of the central portion of the light shielding part, which is appropriately selected, is also set into the range usually from 0.5 to 2.5 µm, preferably from 0.8 to 2.5 µm, more preferably from 0.8 to 1.5 µm.

In the invention, in both the sides of the light shielding part, the colored layer which will be detailed later is formed to cover parts of the sides. The widths of the sides of the light shielding part covered with the colored layer are each set into the range usually from about 0.6 to 7 µm, preferably from about 1.25 to 5.3 µm from each of the ends of the light shielding part. According to this, a high-quality color filter wherein white spots and so forth are not generated can be produced.

The material of the light shielding part is not particularly limited as long as the material comprises at least a light shielding material and a resin. Usually, the light shielding part can be formed from a light shielding part forming composition wherein a photo initiator, a monomer or the like is added to the light shielding material and the resin.

As the light shielding material, a material used in a resin light shielding part, generally used in a color filter, can be used. Examples thereof include light shielding particles such as carbon fine particles, a titanium oxide, a metal oxide, an inorganic pigment and an organic pigment.

Examples of the resin contained in the light shielding part used in the present invention include an ethylene/vinyl acetate copolymer, an ethylene/vinyl chloride copolymer, an ethylene/vinyl copolymer, a polystyrene, an acrylonitrile/styrene copolymer, an ABS resin, a polymethacrylic acid resin, an ethylene/methacrylic acid resin, a polyvinyl chloride resin, a chlorinated vinyl chloride, a polyvinyl alcohol, a cellulose acetate propionate, a cellulose acetatebutyrate, a nylon 6, a nylon 66, a nylon 12, a polyethylene terephthalate, a polybutylene terephthalate, a polycarbonate, a polyvinyl acetal, a polyether ether ketone, a polyether sulfone, a polyphenylene sulfide, a polyarylate, a polyvinyl butyral, an epoxy resin, a phenoxy resin, a polyimide resin, a polyamide imide resin, a polyamic acid resin, a polyether imide resin, a phenol resin, and a urea resin.

Further examples of the resin include polymers and copolymers of: one or more selected from polymerizable monomers of a methyl (meth)acrylate, an ethyl (meth)acrylate, a n-propyl (meth)acrylate, an isopropyl (meth)acrylate, a sec-butyl (meth)acrylate, an isobutyl (meth)acrylate, a tert-butyl (meth)acrylate, a n-pentyl (meth)acrylate, a n-hexyl (meth)acrylate, a 2-ethylhexyl (meth)acrylate, a n-octyl (meth)acrylate, a n-decyl (meth)acrylate, a styrene, an α-methyl styrene, a N-vinyl-2-pyrrolidone and a glycidyl (meth) acrylate; and one or more selected from a (meth) acrylic acid, an acrylic acid dimer (for example, M-5600 manufactured by Toagosei Co., Ltd.), an itaconic acid, a crotonic acid, a maleic acid, a fumaric acid, a vinyl acetic acid, and hydrides thereof. The examples also include polymers of which an ethylenically unsaturated compound having a glycidyl group or a hydroxyl group is added to the above-described copolymer, but is not limited thereto.

Among those illustrated above, the resin containing an ethylenically unsaturated bond is particularly preferably used because the resin forms a cross-link bonding together with a monomer so that excellent strength can be obtained.

The monomer which can be used in formation of the light shielding part used in the present invention include, for example, multifunctional acrylate monomers, and a compound having two or more ethylenically unsaturated bond containing group, such as an acryl group and a methacryl group, can be used. Specific examples include an ethylene glycol (meth) acrylate, a diethylene glycol di(meth)acrylate, a propylene glycol di(meth)acrylate, a dipropylene glycol di(meth)acrylate, a polyethylene glycol di(meth)acrylate, a polypropylene glycol di(meth)acrylate, a hexane di(meth) acrylate, a neopentyl glycol di(meth)acrylate, a glycerin di(meth)acrylate, a glycerin tri(meth)acrylate, a trimethylol propane tri(meth)acrylate, a 1,4-butanediol diacrylate, a pentaerythritol (meth)acrylate, a pentaerythritol tri(meth)acrylate, a pentaerythritol tetra(meth)acrylate, a dipentaerythritol hexa(meth)acrylate, and a dipentaerythritol penta(meth)acrylate.

The multifunctional acrylate monomer may be used as a mixture of two or more thereof. In the present invention, the (meth)acryl refers to either an acryl or a methacryl, and the (meth)acrylate refers to either an acrylate group or a methacrylate group.

As the photo-initiator which can be used in the present invention, a photoradical polymerization initiator which can be activated with UV rays, ionizing irradiations, visible lights or energy lights of other wavelengths, particularly 365 nm or shorter can be listed. Specific examples of such photopolymerization initiators include a benzophenone, a methyl o-benzoyl benzoate, a 4,4-bis(dimethylamine) benzophenone, a 4,4-bis (diethylamine) benzophenone, an α-aminoacetophenone, a 4,4-dichlorobenzophenone, a 4-benzoyl-4-methyl diphenyl ketone, a dibenzyl ketone, a fluorenone, a 2,2-diethoxy acetophenone, a 2,2-dimethoxy-2-phenyl acetophenone, a 2-hydroxy-2-methyl propiophenone, a p-tert-butyl dichloroacetophenone, a thioxanthone, a 2-methyl thioxanthone, a 2-chlorothioxanthone, a 2-isopropyl thioxanthone, a diethyl thioxanthone, a benzyl dimethyl ketal, a benzyl methoxy ethyl acetal, a benzoin methyl ether, a benzoin butyl ether, an anthraquinone, a 2-tert-butyl anthraquinone, a 2-amyl anthraquinone, a β-chloroanthraquinone, an anthrone, a benzanthrone, a dibenzsuberone, a methylene anthrone, a 4-azidobenzylacetophenone, a 2,6-bis(p-azidobenzylidene) cyclohexane, a 2,6-bis(p-azidobenzylidene)-4-methyl cyclohexanone, a 2-phenyl-1,2-butadione-2-(o-methoxycarbonyl) oxime, a 1-phenyl-propanedione-2-(o-ethoxycarbonyl) oxime, a 1,3-diphenyl-propanetrione-2-(o-ethoxycarbonyl) oxime, a 1-phenyl-3-ethoxy-propanetrione-2-(o-benzoyl) oxime, a Michler's ketone, a 2-methyl-1-[4-(methylthio) phenyl]-2-morpholino-propan-1-one, a 2-benzyl-2-dimethylamino-1-(4-morpholinophenyl)-butanone, a naphthalene sulfonyl chloride, a quinoline sulfonyl chloride, a n-phenylthioacridone, a 4,4-azobisisobutyronitrile, a diphenyl disulfide, a benzothiazole disulfide, a triphenyl phosphine, a camphor quinone, an N1717 manufactured by Adeka, a carbon tetrabromide, a tribromophenyl sulfone, a benzoin peroxide, an eosin, a combination of photo-reducing dye such as a methylene blue and a reducing agent such as an ascorbic acid or a triethanol amine, and the like. In the present invention, these photopolymerization initiators can be used alone or as a mixture of two or more thereof.

An example of the method for forming the light shielding part to have the above-mentioned shape is a method of using a lower molecular weight material, out of the above-mentioned resins, as the resin comprised in the light shielding part forming composition, or adding, to the composition, the above-mentioned monomer in a great amount, thereby giving thermal plasticity to the composition. In this case, rectangular light shielding part is formed into a region where the light shielding part is to be formed by the same method for any ordinary light shielding part, and then heat is applied to the light shielding part, thereby softening the light shielding part forming composition. Thus, the light shielding part can be made into the above-mentioned shape.

Another example of the method is a method of using, as the photo initiator comprised in the above-mentioned resin composition, a surface-curable photo initiator, out of the above-mentioned photo initiators, in a great amount. At the time of etching the material of the light shielding part by, for example, photolithography in this case, the surface in the region where the light shielding part is to be formed is cured, but in the inside of the light shielding part material, photo curing does not advance completely. As a result, the light shielding part material is etched into reversely tapered shape having a high angle. After the finish of the etching, the light shielding part material in the reversely tapered form is postbaked so that the reversely tapered portion lowers, whereby the light shielding part of the above-mentioned shape can be formed.

A further example of the method is a method of casting the above-mentioned light shielding part forming composition into a mold having a shape for forming the light shielding part, curing the composition, and then sticking this light shielding part onto a transparent base material. A halftone mask is used to vary the amounts of irradiated light, whereby the light shielding part of the above-mentioned shape can be formed. Here, according to the present invention, a primer layer may be formed between the photocatalyst containing layer to be described later and the light shielding part. Although the effect and the function of the primer layer is not always clear, it is considered that by forming the primer layer, the primer layer provides the function of preventing diffusion of the impurities from the opening part existing in the light shielding part or between the light shielding parts, in particular, impurities such as residues generated from the light shielding part is patterned, to be the factor of inhibiting the wettability change of the photocatalyst containing layer. Therefore, by forming the primer layer, the wettability of the photocatalyst containing layer can be changed with a high sensitivity, and as a result, a pattern with a high resolution can be obtained.

In the present invention, since the primer layer is for preventing the influence on the photocatalyst effect by the impurities existing not only on the light shielding part but also in the opening part formed between the light shielding parts, it is preferable that the primer layer is formed on the entire surface of the light shielding part including the opening part.

The primer layer in the present invention is not particularly limited as long as it has a structure with the primer layer formed without having the light shielding part and the photocatalyst containing layer contacted.

The material for providing the primer layer is not particularly limited, but an inorganic material to be hardly decomposed by the action of the photocatalyst is preferable. Specifically, an amorphous silica can be presented. In the case of using the amorphous silica, the precursor of the amorphous silica is represented by the general formula: $SiX_4$. X is preferably a silicon compound such as a halogen, a methoxy group, an ethoxy group, an acetyl group, or the like, a silanol as a hydrolysis product thereof, or a polysiloxane having a 3,000 or less average molecular weight.

Moreover, the film thickness of the primer layer is preferably in a range of 0.001 μm to 1 μm, and particularly preferably in a range of 0.001 μm to 0.1 μm.

(Photocatalyst Containing Layer)

Next, the photocatalyst containing layer used in the invention will be explained. The photocatalyst containing layer is not particularly limited as long as the layer is a layer comprising at least a photocatalyst and an organopolysiloxane and has the predetermined film thickness. Usually, in the photocatalyst containing layer, photocatalyst fine particles are formed in a state of a mixture wherein the particles are partially or entirely covered with the organopolysiloxane and the photocatalyst fine particles are partially exposed to the surface.

The film thickness of the photocatalyst containing layer used in the invention is specifically set into the range from 0.01 to 0.5 μm, preferably from 0.05 to 0.4 μm, more preferably from 0.1 to 0.2 μm. When the film thickness of the photocatalyst containing layer when it is dried is set into such a range, the photocatalyst containing layer can be rendered a layer wherein the side of the light shielding part has no chipping. When the layer has such a film thickness, the wettability in the surface can be changed by the action of the photocatalyst accompanied by energy irradiation so that this wettability difference in the surface is used to make it possible to form the colored layer which will be detailed later with high precision. If the layer is thicker than the above-mentioned range, the distance between the light shielding part and the colored layer is large. Thus, when the color filter is used in a liquid crystal display, problems such as light leakage of a back light may be unfavorably caused.

Moreover, since the organopolysiloxane is contained in the photocatalyst containing layer, the surface wettability can be changed by the action of the photocatalyst at the time of the energy irradiation so that the area with the energy irradiation can be provided as a lyophilic region, and the area without the energy irradiation can be provided as a liquid repellent region.

According to the present invention, in the part without the energy irradiation, that is, in the liquid repellent region, it is preferable that the contact angle with respect to a liquid having 40 mN/m surface tension is 10° or more, preferably the contact angle with respect to a liquid having a 30 mN/m surface tension is 10° or more, and particularly preferably the contact angle with respect to a liquid having a 20 mN/m surface tension is 10° or more. Since the part without the energy irradiation is the part required to have the liquid repellent property, in the case the contact angle with respect to the liquid is small, due to the insufficient liquid repellent property, for example in the case of coating and curing a colored layer forming coating solution for forming the colored layer to be described later by the ink jet method or the like, the colored layer forming coating solution may be adhered also onto the liquid repellent region, a highly precise pattern can hardly be formed.

Moreover, it is preferable that the photocatalyst containing layer in the part with the energy irradiation, that is, in the lyophilic region, is a layer having the contact angle with respect to a liquid having a 40 mN/m surface tension of less than 9°, preferably the contact angle with respect to a liquid having a 50 mN/m surface tension of 10° or less, and particularly preferably the contact angle with respect to a liquid having a 60 mN/m surface tension of 10° or less. In the case the contact angle with respect to a liquid in the part with the energy irradiation, that is, in the lyophilic region is high, for example the colored layer forming coating solution for forming the colored layer can be repelled also in the lyophilic region. Therefore, for example, at the time of coating the colored layer forming coating solution by the ink jet method, formation of the colored layer may be difficult since the colored layer forming coating solution does not sufficiently spread out.

The contact angle with respect to a liquid here is obtained from the results or a graph of the results of measuring (30 seconds after of dropping liquid droplets from a micro syringe) the contact angle with respect to liquids having various surface tensions using a contact angle measuring device (CA-Z type manufactured by Kyowa Interface Science, Co., Ltd.). Moreover, at the time of the measurement, as the liquids having the various surface tensions, wetting index standard solution manufactured by JUNSEI CHEMICAL CO., LTD. were used.

According to the photocatalyst containing layer used in the present invention, the photocatalyst containing layer may be formed such that a fluorine is contained in the photocatalyst containing layer. Furthermore, the photocatalyst containing layer may be formed such that the fluorine content of the photocatalyst containing layer surface is lowered at the time of irradiating an energy to the photocatalyst containing layer according to the action of the photocatalyst compared with the state before the energy irradiation. Moreover, it may be formed including a decomposing substance to be decomposed by the action of the photocatalyst accompanied by the energy irradiation, and thereby changing the wettability on the photocatalyst containing layer.

Hereinafter, the photocatalyst, the organopolysiloxane, and the other components comprising such a photocatalyst containing layer will be explained.

a. Photocatalyst

First, the photocatalyst used in the present invention will be explained. As the photocatalyst used in the present invention, those known as photo semiconductors, such as a titanium dioxide ($TiO_2$), a zinc oxide (ZnO), a tin oxide ($SnO_2$), a strontium titanate ($SrTiO_3$), a tungsten oxide ($WO_3$), a bismuth oxide ($Bi_2O_3$), and an iron oxide ($Fe_2O_3$) can be presented, and one or two or more kinds as a mixture can be selected and used from them.

In the invention, in particular, a titanium dioxide can be used preferably since it has high band gap energy, it is chemically stable without the toxicity, and it can be obtained easily. There are anatase type and rutile type in the titanium dioxides, and either can be used in the present invention, however, the anatase type titanium dioxide is preferable. The anatase type titanium dioxide has a 380 nm or less excitation wavelength.

As the anatase type titanium dioxide, for example, a hydrochloric acid deflocculation type anatase type titania sol (STS-02 (average particle diameter 7 nm) manufactured by ISHIHARA SANGYO KAISHA, LTD., ST-K01 manufactured by ISHIHARA SANGYO KAISHA, LTD.), a nitric acid deflocculation type anatase type titaniasol (TA-15 (average particle diameter 12 nm) manufactured by Nissan Chemical Industries, Ltd.) can be presented.

With a smaller particle diameter of the photocatalyst, the photocatalyst reaction can be generated more effectively, and thus it is preferable. An average particle diameter of 50 nm or less is preferable, and use of a photocatalyst of 20 nm or less is particularly preferable.

The photocatalyst content in the photocatalyst containing layer used in the present invention can be set in a range of 5 to 60% by weight, preferably in a range of 20 to 40% by weight.

b. Organopolysiloxane

Next, the organopolysiloxane used in the present invention will be explained. The organopolysiloxane used in the present invention is not particularly limited as long as it can change the wettability of the photocatalyst containing layer surface by the action of the photocatalyst accompanied by the energy irradiation. In particular, those having a high bond energy such that the principal skeleton is not decomposed by the photo excitation of the photocatalyst, and having an organic substituent to be decomposed by the action of the photocatalyst are preferable. Specifically, (1) an organopolysiloxane to provide high strength by hydrolysis or polycondensation of such as a chloro or an alkoxy silane by the sol gel reaction or the like, (2) an organopolysiloxane obtained by cross-linking a reactive silicone having the excellent water repellent property or the oil repellent property, or the like can be presented.

In the case (1), it is preferably an organopolysiloxane as a hydrolyzed condensation product or a co-hydrolyzed condensation product of one or two or more kinds of silicon compounds represented by the general formula:

$$Y_nSiX_{(4-n)}$$

(Here, Y is an alkyl group, a fluoroalkyl group, a vinyl group, an amino group, a phenyl group, a chloroalkyl group, an isocyanate group, an epoxy group or an organic group containing them; X is an alkoxyl group, an acetyl group or a halogen; and n is an integer from 0 to 3). Here, the alkoxy group represented by X is preferably a methoxy group, an ethoxy group, a propoxy group, or a butoxy group. Moreover, the number of atoms of the entire organic group represented by Y is preferably in a range of 1 to 20, in particular, in a range of 5 to 10.

Thereby, at the time of forming the photocatalyst containing layer, the surface can be provided with the liquid repellent property by the Y comprising the organopolysiloxane. Moreover, according to the action of the photocatalyst accompanied by the energy irradiation, the lyophilic property can be provided by the decomposition of the Y, or the like.

Moreover, since the photocatalyst containing layer before the energy irradiation can have the particularly high liquid repellent property in the case an organopolysiloxane having the Y comprising the organopolysiloxane as a fluoro alkyl group, it is preferable to use an organopolysiloxane having the fluoro alkyl group in the case such as a high liquid repellent property is required. As such an organopolysiloxane, specifically, a hydrolyzed condensation product or a co-hydrolyzed condensation product of one or two or more kinds of the below-mentioned fluoroalkylsilanes can be presented. Those generally known as a fluorine based silane coupling agent can be used.

$CF_3(CF_2)_3CH_2CH_2Si(OCH_3)_3$;
$CF_3(CF_2)_5CH_2CH_2Si(OCH_3)_3$;
$CF_3(CF_2)_7CH_2CH_2Si(OCH_3)_3$;
$CF_3(CF_2)_9CH_2CH_2Si(OCH_3)_3$;
$(CF_3)_2CF(CF_2)_4CH_2CH_2Si(OCH_3)_3$;
$(CF_3)_2CF(CF_2)_6CH_2CH_2Si(OCH_3)_3$;
$(CF_3)_2CF(CF_2)_8CH_2CH_2Si(OCH_3)_3$;
$CF_3(C_6H_4)C_2H_4Si(OCH_3)_3$;
$CF_3(CF_2)_3(C_6H_4)C_2H_4Si(OCH_3)_3$;
$CF_3(CF_2)_5(C_6H_4)C_2H_4Si(OCH_3)_3$;
$CF_3(CF_2)_7(C_6H_4)C_2H_4Si(OCH_3)_3$;
$CF_3(CF_2)_3CH_2CH_2SiCH_3(OCH_3)_2$;
$CF_3(CF_2)_5CH_2CH_2SiCH_3(OCH_3)_2$;
$CF_3(CF_2)_7CH_2CH_2SiCH_3(OCH_3)_2$;
$CF_3(CF_2)_9CH_2CH_2SiCH_3(OCH_3)_2$;
$(CF_3)_2CF(CF_2)_4CH_2CH_2SiCH_3(OCH_3)_2$;
$(CF_3)_2CF(CF_2)_6CH_2CH_2SiCH_3(OCH_3)_2$;
$(CF_3)_2CF(CF_2)_8CH_2CH_2SiCH_3(OCH_3)_2$;
$CF_3(C_6H_4)C_2H_4SiCH_3(OCH_3)_2$;
$CF_3(CF_2)_3(C_6H_4)C_2H_4SiCH_3(OCH_3)_2$;
$CF_3(CF_2)_5(C_6H_4)C_2H_4SiCH_3(OCH_3)_2$;
$CF_3(CF_2)_7(C_6H_4)C_2H_4SiCH_3(OCH_3)_2$;
$CF_3(CF_2)_3CH_2CH_2Si(OCH_2CH_3)_3$;
$CF_3(CF_2)_5CH_2CH_2Si(OCH_2CH_3)_3$;
$CF_3(CF_2)_7CH_2CH_2Si(OCH_2CH_3)_3$;
$CF_3(CF_2)_9CH_2CH_2Si(OCH_2CH_3)_3$;
$CF_3(CF_2)_7SO_2N(C_2H_5)_{C2}H_4CH_2Si(OCH_3)_3$.

Moreover, as the reactive silicone (2), compounds having a skeleton represented by the following general formula can be presented.

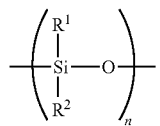

Here, n is an integer of 2 or more, R1, R2 each are a substituted or nonsubstituted alkyl, alkenyl, aryl or cyanoalkyl group having 1 to 10 carbon atoms, and 40% or less of the entirety based on the mole ratio is a vinyl, a phenyl, or a halogenated phenyl. Moreover, those having R1, R2 as a methyl group are preferable since the surface energy becomes smallest, and it is preferable that a methyl group accounts for 60% or more based on the mole ratio. Moreover, at least one reactive group such as a hydroxyl group is provided in a molecular chain at the chain end or the side chain.

It is preferable that the organopolysiloxane is contained in the photocatalyst containing layer from 5% by weight to 90% by weight, in particular, about from 30% by weight to 60% by weight.

c. Other Substances

To the photocatalyst containing layer used in the present invention, together with the organopolysiloxane, a stable organosilicon compound not to have the cross-linking reaction such as a dimethylpolysiloxane may be mixed to a binder. Furthermore, as a binder, a polysiloxane having a principal skeleton with a high bond energy not to be decomposed by the photo excitation of the photocatalyst, not having an organic substituent, or having an organic substituent can be presented. Specifically, a hydrolysis or polycondensation product of a tetramethoxysilane, a tetraethoxysilane or the like may be contained.

Furthermore, in order to aid the function of changing the wettability of the organopolysiloxane, or the like, a decomposable substance to be decomposed by the energy irradiation may be contained. As such a decomposable substance, a surfactant to be decomposed by the action of the photocatalyst, having the function of changing the wettability of the photocatalyst containing layer surface according to the decomposition can be presented. Specifically, hydrocarbons of the respective series of NIKKO L BL, BC, BO, and BB manufactured by Nikko Chemicals Co., Ltd., and fluorine base or silicone base nonionic surfactants such as ZONYL FSN and FSO manufacture by Du Pont Kabushiki Kaisha, Surflon S-141 and 145 manufactured by ASAHI GLASS CO., LTD., Megaface F-141 and 144 manufactured by DAINIPPON INK AND CHEMICALS, Inc., FTERGENT F-200 and F251 manufactured by Neos, UNIDYNE DS-401 and 402 manufactured by DAIKIN INDUSTRIES, Ltd., and Fluorad FC-170 and 176 manufactured by 3M can be cited, and cationic surfactants, anionic surfactants and amphoteric surfactants also can be used.

Other than the surfactants, oligomers and polymers such as a polyvinyl alcohol, an unsaturated polyester, an acrylic resin, a polyethylene, a diallylphthalate, an ethylenepropylene diene monomer, an epoxy resin, a phenol resin, a polyurethane, a melamine resin, a polycarbonate, a polyvinyl chloride, a polyamide, a polyimide, a styrene-butadiene rubber, a chloroprene rubber, a polypropylene, a polybutylene, a polystyrene, a polyvinyl acetate, a nylon, a polyester, a polybutadiene, a polybenzimidazole, a polyacrylonitrile, an epichlorohydrine, a polysulfide, and a polyisoprene can be cited.

d. Containment of the Fluorine

Moreover, according to the present invention, it is preferable that the photocatalyst containing layer contains a fluorine, and furthermore, the photocatalyst containing layer is formed so as to have the fluorine content of the photocatalyst containing layer surface is lowered with respect to the state before the energy irradiation by the action of the photocatalyst at the time an energy is irradiated to the photocatalyst containing layer. Thereby, according to the pattern irradiation of the energy, as it will be described later, a pattern having a part with a small fluorine content can be formed easily. Here, since the fluorine has an extremely low surface energy, the surface of a substance containing a large amount of a fluorine has a smaller critical surface tension. Therefore, the critical surface tension of a part with a small fluorine content is larger than the critical surface tension of the surface of a substance with a large fluorine content. That is, it denotes that the part with a small fluorine content becomes a lyophilic region compared with the part with a large fluorine content. Therefore, by forming a pattern comprising a part with a small fluorine content compared with the surface of the periphery, a pattern of a lyophilic region is formed in a liquid repellent region.

Accordingly, in the case of using such a photocatalyst containing layer, energy is irradiated thereto in a pattern form, whereby a pattern of lyophilic regions can easily be formed inside the liquid repellent region. Accordingly, when a colored layer forming coating solution is applied by, for example, an ink jet method, a highly precise colored layer can be formed.

As to the fluorine content in the photocatalyst containing layer containing a fluorine as mentioned above, the fluorine content in the lyophilic region having a low fluorine content formed by the energy irradiation is 10 or less based on the fluorine content in the area without the energy irradiation as 100, it is preferably 5 or less, and it is particularly preferably 1 or less.

According to the range, a large difference can be generated in terms of the lyophilic property in the energy irradiated part and the unirradiated part. Therefore, by adhering for example a colored layer forming coating solution to such a photocatalyst containing layer, the colored layer can be formed accurately only in the lyophilic region with the fluorine content lowered so that a color filter good in precision can be obtained. The lowering ratio is based on the weight.

As to the measurement of the fluorine content in the photocatalyst containing layer, various methods commonly executed can be used, and it is not particularly limited as long as it is a method capable of measuring the fluorine amount quantitatively on the surface such as the X-ray Photoelectron Spectroscopy, the ESCA (it is also referred to as the Electron Spectroscopy for Chemical Analysis), the fluorescent X-ray analysis method, and the mass spectrometry.

Moreover, according to the present invention, a titanium dioxide can be used preferably as the photocatalyst as mentioned above. As the fluorine content in the photocatalyst containing layer in the case of using the titanium dioxide, it is preferable that the fluorine (F) element is contained in the photocatalyst containing layer surface by the ratio with the fluorine (F) element of 500 or more, preferably 800 or more, and particularly preferably 1,200 or more with the premise that the titanium (Ti) element is 100 according to the analysis and quantification by the X-ray Photoelectron Spectroscopy.

Since the fluorine (F) is contained in the photocatalyst containing layer to this extent, the critical surface tension on the photocatalyst containing layer can be made sufficiently low so that the liquid repellent property in the surface can be ensured. Thereby, the wettability difference of the pattern part with the fluorine content reduced by the energy pattern irradiation with respect to the surface lyophilic region can be made larger so that the precision of the color filter to be obtained finally can be improved.

Furthermore, according to such a color filter, as to the fluorine content in the lyophilic region formed by the energy pattern irradiation, it is preferable that the fluorine (F) element is contained by the ratio of 50 or less, preferably 20 or less, and particularly preferably 10 or less with the premise that the titanium (Ti) element is 100.

In the case the fluorine content in the photocatalyst containing layer is reduced to this extent, a lyophilic property sufficient for forming a color filter can be obtained so that the color filter can be formed precisely according to the liquid repellent property and the wettability difference with respect to the part with the energy not irradiated, and thus a color filter having the high utilization value can be obtained.

e. Method for Forming a Photocatalyst Containing Layer

As to the method for forming the photocatalyst containing layer mentioned above, it can be formed by dispersing the photocatalyst and organopolysiloxane in a solvent as needed with the other additives so as to prepare a photocatalyst containing layer forming coating solution, and coating the coating solution onto a base material. As the solvent to be used, alcohol based organic solvents such as an ethanol and an isopropanol are preferable. The coating operation can be carried out by a known coating method such as spin coating, spray coating, dip coating, roll coating and bead coating. In the case an ultraviolet ray curing type component is contained as a binder, the photocatalyst containing layer can be formed with an execution of a curing process by irradiating an ultraviolet ray.

Figure 2A:
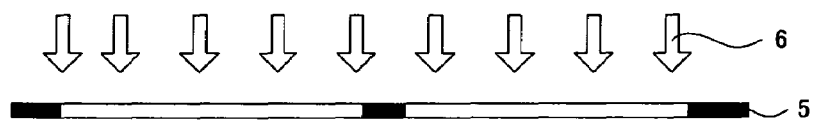
FIGS. 2A and 2B are each an explanatory view illustrating the step of changing the wettability of a photocatalyst containing layer used in the invention.
Figure 2B:
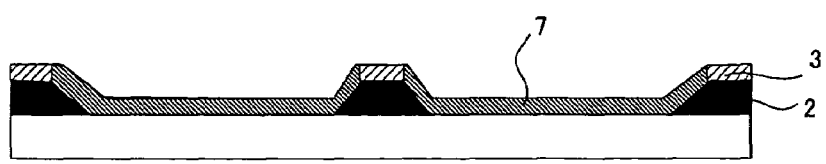

The photocatalyst containing layer forming coating solution is usually made to have a solid content concentration of about 0.1 to 10%, and applied into a film thickness of about 1 to 100 µm to cover the light shielding part and the base material. This makes it possible to form a photocatalyst containing layer to have the above-mentioned film thickness. When the photocatalyst containing layer forming coating solution is applied into such a film thickness to form a photocatalyst containing layer having the above-mentioned film thickness, the photocatalyst containing layer can be formed without being chipped at the side faces of the light shielding part, or the like.

f. Method for Forming a Wettability Changed Pattern on the Photocatalyst Containing Layer Next, the method for forming a wettability changed pattern with the wettability changed by the pattern for forming the colored layer to be described later with the energy irradiation to the photocatalyst containing layer will be explained. According to the present invention, as mentioned above, the organopolysiloxane in the photocatalyst containing layer has the wettability change by the action of the photocatalyst accompanied by the energy irradiation. Therefore, for example, as shown in FIGS. 2A and 2B, by irradiating the energy 6 to the photocatalyst containing layer 3 via such as a photo mask 5 (FIG. 2A), the wettability changed pattern 7 with the wettability changed can be formed on the photocatalyst containing layer 3 (FIG. 2B). By forming the wettability changed pattern on the photocatalyst containing layer, at the time of coating the colored layer forming coating solution for forming the colored layer to be described later by the ink jet method or the like, the colored layer forming coating solution can be adhered highly precisely only on the wettability changed pattern 7 with the wettability changed without the ink adhesion onto the area with no energy irradiated so that the colored layer forming coating solution can be adhered highly precisely.

Here, as the energy to be irradiated to the photocatalyst containing layer, the method is not particularly limited as long as it is a method for irradiating an energy capable of changing the wettability of the photocatalyst containing layer. The energy irradiation (exposure) in the present invention is the concept including any irradiation of the energy line capable of changing the wettability of the photocatalyst containing layer surface, and thus it is not limited to the visible light irradiation.

The light wavelength of the light generally used for the energy irradiation can be set in a range of 400 nm or less, preferably in a range of 150 nm to 380 nm or less. This is because the preferable photocatalyst used for the photocatalyst containing layer is a titanium dioxide as mentioned above, and a light having the above-mentioned wavelength is preferable as the energy for activating the photocatalyst action by the titanium dioxide.

As a light source to be used for the energy irradiation, a mercury lamp, a metal halide lamp, a xenon lamp, an excimer lamp, and various other light sources can be presented. Moreover, in addition to the method of executing the pattern irradiation via a photo mask using the light source mentioned above, a method of drawing irradiation in a pattern using a laser such as an excimer or a YAG can be used as well.

The energy irradiation amount at the time of the energy irradiation is defined to be the irradiation amount necessary for changing the wettability of the photocatalyst containing layer surface by the action of the photocatalyst in the photocatalyst containing layer.

At the time, by irradiating the energy while heating the photocatalyst containing layer, the sensitivity can be further raised so that the wettability can be changed efficiently, and thus it is preferable in this regard. Specifically, it is preferable to heat in a range of 30° C. to 80° C.

About the direction of the energy irradiation in the invention is as follows: in the case that the base material which will be detailed later is transparent, pattern energy irradiation through a photo mask or a laser drawing irradiation may be performed from any one of the side of the base material and the side of the photocatalyst containing layer. In the invention, it is preferable to use scattered light out of the above energies for the following reasons: the tapered light shielding part is formed on the base material in the invention and even if energy is irradiated onto the entire surface thereof from the side of the base material, the wettability of the photocatalyst containing layer formed on the tapered portions of the light shielding part can also be changed.

Accordingly, when the energy is irradiated form the base material side, the invention has an advantage that the wettability changed pattern can be effectively formed without using the step of positioning a photo mask and so forth or other steps. In the meantime, in the case that the base material is not transparent, it is necessary that the energy is irradiated from the side of the photocatalyst containing layer.

(Colored Layer)

Next, the colored layer used in the color filter in the invention will be explained. The colored layer is a layer formed on the photocatalyst containing layer and formed in consistency with the wettability changed pattern, wherein lyophilic regions are formed in a pattern form by irradiating energy onto the photocatalyst containing layer.

The colored layer is usually composed of three colors of red (R), green (G) and blue (B). In the invention, the type of the colored pattern in this colored layer may be a known arrangement type, such as a stripe type, a mosaic type, a triangle type or a 4-pixel arrangement type. The colored area can be set at will.

In the invention, the method for coloring this colored layer is not particularly limited. Examples thereof include a method of applying a known paint in a known manner such as spray coating, dip coating, roll coating or bead coating; and a vacuum thin film forming method. In the invention, it is preferable to color the colored layer by an ink jet method. This makes it possible to form the colored layer on the wettability changed pattern with high precision.

A colored layer forming coating solution and other factors used to form such a colored layer may be the same as used to form a colored layer in any ordinary color filter. Thus, the detailed explanation thereof is omitted herein.

(Base Material)

Next, the transparent base material used in the present invention will be explained. The transparent base material used in the present invention is not particularly limited as long as the light shielding part and the photocatalyst containing layer can be formed, and thus those conventionally used for color filters can be used. Specifically, a transparent rigid material without flexibility, such as a quartz glass, a pyrex (registered trademark) glass, and a synthetic quartz plate, and a transparent flexible material having flexibility, such as a transparent resin film and an optical resin plate can be presented.

(Color Filter)

The color filter of the invention is not particularly limited as long as the color filter is a color filter having the base material, the light shielding part, the photocatalyst containing layer, and the colored layer. The color filter may be a color filter having, besides the above-mentioned members, any other member that is ordinarily used in a color filter, such as an ITO film which is a transparent electrode layer, or an over-coating layer. Since the other member is the same as used in ordinary color filters, the explanation thereof is omitted herein.

B. Method of Producing the Color Filter

Next, a method of producing the color filter of the present invention will be explained. The method of producing a color filter of the invention comprising: a base material; a light shielding part formed on the base material and containing a light shielding material and a resin; a photocatalyst containing layer formed to cover the base material and the light shielding part and containing a photocatalyst and an organopolysiloxane; and a colored layer formed on the photocatalyst containing layer in an opening part made in the light shielding part, wherein the method of producing a color filter comprising: a light shielding part forming step of forming the light shielding part in such a manner that the widths of thin film regions of both sides each having a film thickness decreased in a tapered form from a central portion of the light shielding part are each in the range from 20 to 40% of the line width of the light shielding part; and a photocatalyst containing layer forming step of applying a photocatalyst containing layer forming composition, comprising at least the photocatalyst and the organopolysiloxane and having a concentration of solid content of 0.1 to 10%, into a film thickness in the range from 1 to 100 µm, and drying the resultant to form the photocatalyst containing layer.

Figure 3A:
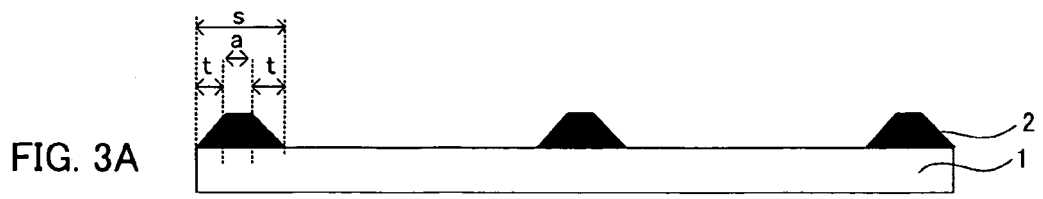
FIGS. 3A to 3C are each an explanatory view illustrating an example of a method for producing the color filter of the invention.
Figure 3B:
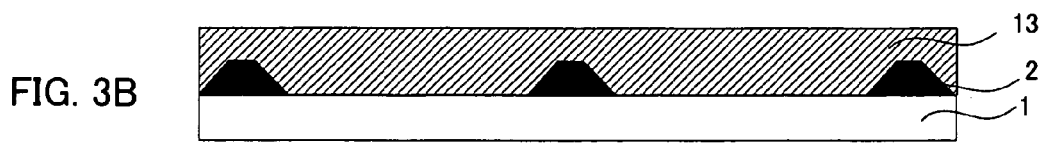
Figure 3C:
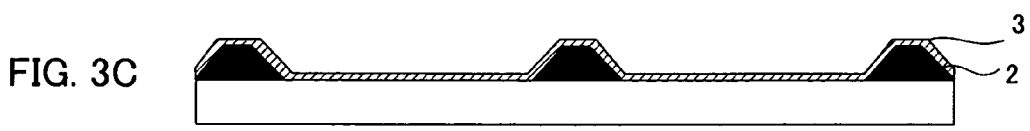

As illustrated in, for example, FIGS. 3A to 3C, the color filter producing method of the invention comprises: a light shielding part forming step of forming a light shielding part 2 on a base material 1 in such a manner that the widths "t" of thin film regions of both sides each having a film thickness decreased in a tapered form from a central portion "a" of the light shielding part 2 are each in the range of the predetermined percentages of the width "s" of the light shielding part 2 (FIG. 3A); and a photocatalyst containing layer forming step of applying a photocatalyst containing layer forming composition 13 having the predetermined concentration of solid content into the predetermined film thickness so as to cover the light shielding part 2 and the base material 1 (FIG. 3B), and then drying the resultant to form a photocatalyst containing layer 3 (FIG. 3C).

According to the invention, in the light shielding part forming step, the light shielding part having the thin film regions, wherein a change in the film thickness is small, is formed; therefore, in the photocatalyst containing layer forming step, at the time of applying the photocatalyst containing layer forming composition having the above-mentioned solid content concentration into the above-mentioned film thickness to form the photocatalyst containing layer, the photocatalyst containing layer is neither chipped nor gives film thickness unevenness at also the side faces of the light shielding part.

Figure 4A:
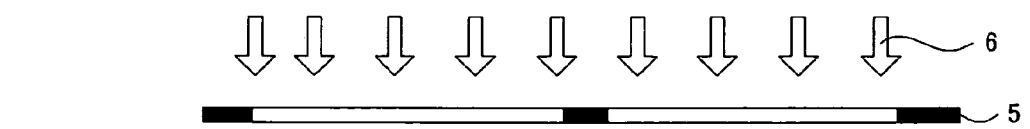
FIGS. 4A to 4C are each an explanatory view illustrating another example of a method for producing the color filter of the invention.
Figure 4B:
Figure 4C:
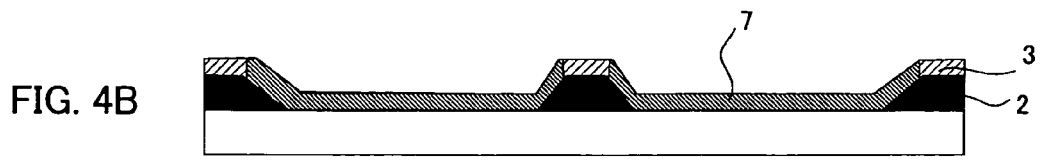
Figure 5A:
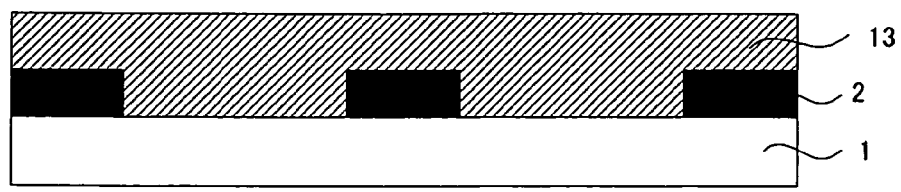
FIGS. 5A and 5B are each an explanatory view for explaining a method of forming a conventional photocatalyst containing layer.
Figure 5B:
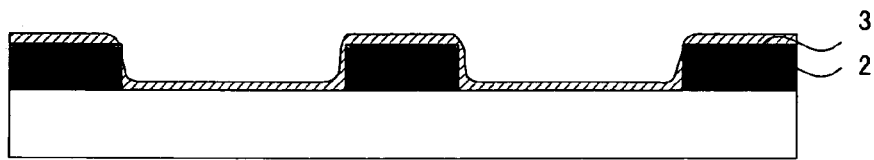

According to this, as illustrated in FIGS. 4A to 4C, at the time of irradiating energy 6 onto the surface of this photocatalyst containing layer 3, using a photo mask 5 or the like (FIG. 4A), to form a wettability changed pattern 7, wherein the wettability in the surface of the photocatalyst containing layer 3 is changed (FIG. 4B), the wettability of the wettability changed pattern 7 can be evenly changed. Accordingly, at the time of using a difference in the wettability between this wettability changed pattern 7 and regions irradiated with no energy in the photocatalyst containing layer 3 to apply a colored layer forming coating solution, for colored layer formation, to the opening part made in the light shielding part 2 so as to form a colored layer 4 (FIG. 4C), the colored layer forming coating solution can be uniformly wetted and spread. As a result, a high-quality color filter wherein white spots or color unevenness is not present on the colored layer 4 can be produced.

The following will explain each of the steps of the color filter producing method of the invention.

1. Light Shielding Part Forming Step

First, the light shielding part forming step in the color filter producing method of the invention will be explained. The light shielding part forming step is a step of forming a light shielding part having light shielding part with a predetermined shape on a base material. Specifically, the step is a step of forming a light shielding part in such a manner that the widths of thin film regions of both sides each having a film thickness decreased in a tapered form from a central portion of the light shielding part are each in the range from 20 to 40% of the line width of the light shielding part, preferably from 25 to 35% thereof, more preferably from 28 to 32% thereof.

The width of the whole of the light shielding part formed in the present step, that is, the line width of the light shielding part, which depends on the shape of the color filter or other factors, is set into the range usually from 6 to 35 µm, preferably from 10 to 30 µm, more preferably from 16 to 30 µm. The maximum film thickness is appropriately selected, and is set into the range usually from 0.5 to 2.5 µm, preferably from 0.8 to 2.5 µm, more preferably from 0.8 to 1.5 µm.

In the present step, the method for forming the light shielding part is not particularly limited as long as the method makes it possible to form of the light shielding part into such a shape. Examples of the method include: a method of using, instead of a resin contained in a light shielding part forming material used when an ordinary light shielding part is formed, such a resin that has a low molecular weight; a method of adding a large amount of a monomer to a light shielding part forming material; and a method of forming a light shielding part in the same way for forming an ordinary light shielding part, and then applying heat to the part, thereby softening the light shielding part forming composition to make the composition into the above-mentioned shape.

Such a method for forming the light shielding part and the material for forming the light shielding part may be the same as explained in the above-mentioned item "A. Color filter". Thus, the detailed explanation thereof is omitted herein.

2. Photocatalyst Containing Layer Forming Step

Next, the photocatalyst containing layer forming step in the invention will be explained. The photocatalyst containing layer forming step is a step of forming a photocatalyst containing layer to cover the above-mentioned light shielding part and base material, and is a step of applying a photocatalyst containing layer forming composition comprising at least a photocatalyst and an organopolysiloxane and having the predetermined concentration of solid content into a film thickness in the predetermined range, and then drying the resultant to form a photocatalyst containing layer. In the present step, the photocatalyst containing layer forming composition having the solid content concentration is applied into the above-mentioned film thickness, whereby the photocatalyst containing layer can be formed into the target film thickness. Moreover, for example, at the side face of the light shielding part also, the photocatalyst containing layer having an even film thickness can be formed without the generation of such as unevenness or chipping.

The solid content concentration in the photocatalyst containing layer is specifically set into the range from 0.1 to 10%, preferably from 0.5 to 5%, more preferably from 1 to 3%. The photocatalyst containing layer forming composition is specifically applied into a film thickness in the range from 1 to 100 µm, preferably from 3 to 80 µm, more preferably from 5 to 50 µm. The film thickness is a film thickness immediately after the photocatalyst containing layer forming composition is applied. This makes it possible to set the film thickness of the photocatalyst containing layer formed in the present step into the range from about 0.01 to 0.5 µm, preferably from about 0.05 to 0.4 µm, more preferably from about 0.1 to 0.2 µm.

The photocatalyst containing layer forming composition may be a composition prepared by dispersing the above-mentioned photocatalyst and organopolysiloxane, together with one or more optional additives, into a solvent. The method for applying this composition into the above-mentioned film thickness may be a known coating method such as spin coating, spray coating, dip coating, roll coating or bead coating.

The method for drying the photocatalyst containing layer may be, for example, a method of using a hot plate, an infrared heater or an oven.

The photocatalyst, the organopolysiloxane and other materials used in the present step may be the same as explained in the item "A. Color filter". Thus, the explanation thereof is omitted herein.

3. Others

The color filter producing method of the invention may comprise, besides the above-mentioned light shielding part forming step and photocatalyst containing layer forming step, an energy irradiating step of forming a wettability changed pattern wherein the wettability in the surface of the photocatalyst containing layer is changed by the action of the photocatalyst accompanied by the energy irradiation, a colored layer forming step of forming a colored layer onto the wettability changed pattern, wherein the wettability in the surface of the photocatalyst containing layer is changed, or some other step.

The method for irradiating energy or the method for forming the colored layer in such a step may be the same as explained in the above-mentioned item "A. Color filter". Thus, the detailed explanation is omitted herein. In the invention, the following may be performed besides the above-mentioned steps: a step of forming a different member formed in an ordinary color filter, such as a step of forming an ITO film which is a transparent electrode layer or a step of forming an over-coating layer. The step may also be the same as in the method of producing an ordinary color filter. Thus, the explanation thereof is omitted herein.

The present invention is not limited to the embodiments. The embodiments are merely examples, and any one having the substantially same configuration as the technological idea disclosed in the claims of the present invention and the same effects is included in the technological scope of the present invention.

EXAMPLES

The invention will be more specifically explained by way of an example and a comparative example.

Example

1. Formation of the Light Shielding Part

A mixture of the below-mentioned composition was dissolved by heating at 90° C. and carrying out the centrifugal separation at 12,000 rpm, and then it was filtrated with a 1 µm glass filter. By adding 1% by weight of an ammonium dichromate as a cross linking agent to the obtained solution, a light shielding part forming coating solution for was prepared.

| | |
|---|---|
| Carbon black (produced by Mitsubishi Chemical Corporation #950) | 4 parts by weight |
| Polyvinyl alcohol (produced by Nippon Synthetic Chemical Industry Co., Ltd., GOHSENOL AH-26) | 0.7 part by weight |
| Ion exchange water | 95.3 parts by weight |

A light shielding part pattern (resist pattern) was formed as below using the obtained light shielding part forming coating solution for the evaluation. First, the above-mentioned light shielding part forming coating solution was coated onto a sodium glass transparent base material with a spin coater and dried by a hot plate at 80° C. for 1 minute. The film thickness of the resist after the drying operation measured by a stylus film thickness meter (α-step, produced by KLA-Tencor Corporation) was 1 µm. Next, the resist is imagewise exposed to light from a mercury lamp into a pattern form of a light shielding part through a gradation mask (center concentration: 2.0, and (10-µm width) sides: concentrations of 10 steps (the concentration of the outermost step: 0.1). Subsequently, it was soaked in a developing agent containing 0.05% concentration of a potassium hydroxide and 0.1% concentration of a nonionic surfactant (EMULGENA-60 produced by KAO CORPORATION) at 25° C. for development so as to obtain a light shielding pattern. Thereafter, by carrying out a heating treatment at 60° C. for 30 minutes, the light shielding part was formed to obtain a substrate for forming a color filter. The light shielding part was formed into a pattern having lines and spaces wherein the width of the light shielding part was 20 µm and the width of opening parts was 80 µm.

2. Formation of a Photocatalyst Containing Layer

An ST-K03 (manufactured by ISHIHARA SANGYO KAISHA, Ltd.), which is a photocatalyst inorganic coating agent, was diluted by 10 times with isopropanol to prepare a photocatalyst containing layer composition. At this time, the solid content concentration was 0.1% and the thickness of the applied film was 100 µm. The above-mentioned photocatalyst containing layer forming composition was applied onto the glass substrate wherein the tapered light shielding part was formed with a spin coater, and then dried at 150° C. for 10 minutes to form a transparent photocatalyst containing layer (film thickness: 0.15 µm). Next, the resultant was irradiated, from its rear face, with light from a super high pressure mercury lamp (illuminance: 30 mW/cm$^2$, 365 nm). In this way, the photocatalyst containing layer formed on the opening part and the individual end portions (the regions extending from the ends to the insides by 5 µm) was made lyophilic.

3. Formation of a Colored Layer

A piezoelectrically driving ink jet device was used to jet a red thermosetting ink (viscosity: 5 cp) into the opening part. As a result, the thermosetting ink wetted and spread satisfactorily into the opening part and onto both side ends of the light shielding part. The viscosity was a value obtained when the coating solution was measured at 20° C. with a viscometer, VIBRO VISCOMETER CJV5000 (manufactured by A & D Co., LTD). Thereafter, the resultant was subjected to heating treatment to form a red colored layer. The colored layer wetted and spread evenly into the opening part so that white spots and so forth were not generated. Subsequently, in the same way, blue and green colored layers were formed to produce a color filter. In the blue and green colored layers also, white spots were not generated as in the same manner as in the red colored layer.

Comparative Example

A color filter was formed in the same way as in Example except that when the light shielding part was formed, the light was irradiated using an ordinary photo mask but not using the gradation mask. At this time, the thermosetting inks for the colored layers neither wetted nor spread evenly into the opening part partitioned by light shielding part, so that white spots were generated in end portion of the light shielding part.

What is claimed is:

1. A color filter comprising:
   a base material;
   a light shielding part formed on the base material and containing a light shielding material and a resin;
   a photocatalyst containing layer formed to cover the base material and the light shielding part and containing a photocatalyst and an organopolysiloxane; and
   a colored layer formed on the photocatalyst containing layer in an opening part made in the light shielding part,
   wherein widths of thin film regions of both sides each having a film thickness decreased in a tapered form from a central portion of the light shielding part are each in the range from 20 to 40% of a line width of the light shielding part, and a film thickness of the photocatalyst containing layer is in the range from 0.01 to 0.5 µm.

2. A method of producing a color filter comprising:
   a base material;
   a light shielding part formed on the base material and containing a light shielding material and a resin;
   a photocatalyst containing layer formed to cover the base material and the light shielding part and containing a photocatalyst and an organopolysiloxane; and
   a colored layer formed on the photocatalyst containing layer in an opening part made in the light shielding part,
   wherein the method of producing a color filter comprising:
   a light shielding part forming step of forming the light shielding part in such a manner that widths of thin film regions of both sides each having a film thickness decreased in a tapered form from a central portion of the light shielding part are each in the range from 20 to 40% of a line width of the light shielding part; and
   a photocatalyst containing layer forming step of applying a photocatalyst containing layer forming composition, comprising at least the photocatalyst and the organopolysiloxane and having a concentration of solid content of 0.1 to 10%, into a film thickness in the range from 1 to 100 µm, and drying the resultant to form the photocatalyst containing layer.

* * * * *